United States Patent

[11] 3,601,457

| [72] | Inventor | John F. Helms |
| | | Warminster, Pa. |
| [21] | Appl. No. | 853,125 |
| [22] | Filed | Aug. 26, 1969 |
| [45] | Patented | Aug. 24, 1971 |
| [73] | Assignee | SKF Industries Inc. |
| | | King of Prussia, Pa. |

[54] SEAL FOR NEEDLE ROLLER BEARINGS
4 Claims, 3 Drawing Figs.

[52] U.S. Cl. .................................................... 308/187.2
[51] Int. Cl. ...................................................... F16c 29/06
[50] Field of Search ......................................... 308/187.1,
187.2; 277/94

[56] References Cited
UNITED STATES PATENTS

| 2,173,250 | 9/1939 | Fay .............................. | 308/187.2 |
| 3,348,889 | 10/1967 | Schaeffler et al. ............. | 308/187.2 |
| 3,400,989 | 9/1968 | Dixon et al. .................. | 277/94 |

FOREIGN PATENTS

| 697,922 | 11/1964 | Canada ....................... | 308/187.2 |

*Primary Examiner*—Martin P. Schwadron
*Assistant Examiner*—H. Frank Susko
*Attorney*—Howson and Howson ABSTRACT: A bearing assembly adapted to be mounted on a shaft comprising a cup-shaped housing having a generally cylindrical center portion and a pair of radially inwardly directed flanges at opposite ends of said center portion, means defining a pocket adjacent at least one of said flanges, a plurality of rolling elements mounted interiorly of the housing, a retainer for circumferentially spacing the rollers and a seal adapted to be mounted in the housing at opposite axial ends thereof, said seal comprising a casing made of a resilient material, an annular ringlike reinforcing member mounted in said casing, said casing having an enlarged circumferentially extending bead portion projecting radially outwardly from one outer edge of said reinforcing member, a sealing lip projecting from the inner edge of said reinforcing member, said sealing lip having a reduced neck portion and a terminal edge configuration providing two circumferentially extending sealing lip edges when the sealing lip is deflected in either an outward or an inward direction upon assembly of the bearing to a shaft.

PATENTED AUG24 1971 3,601,457
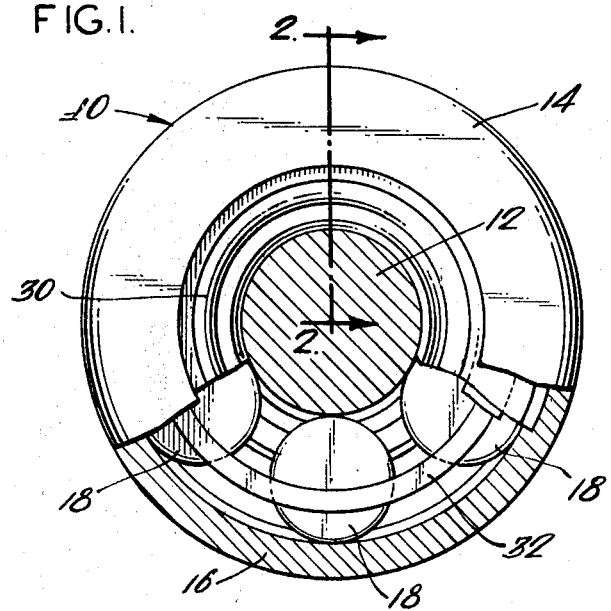
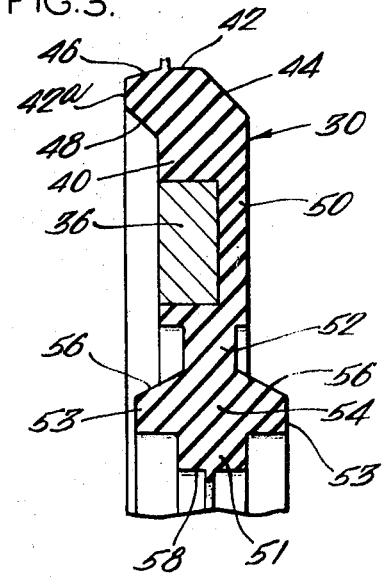
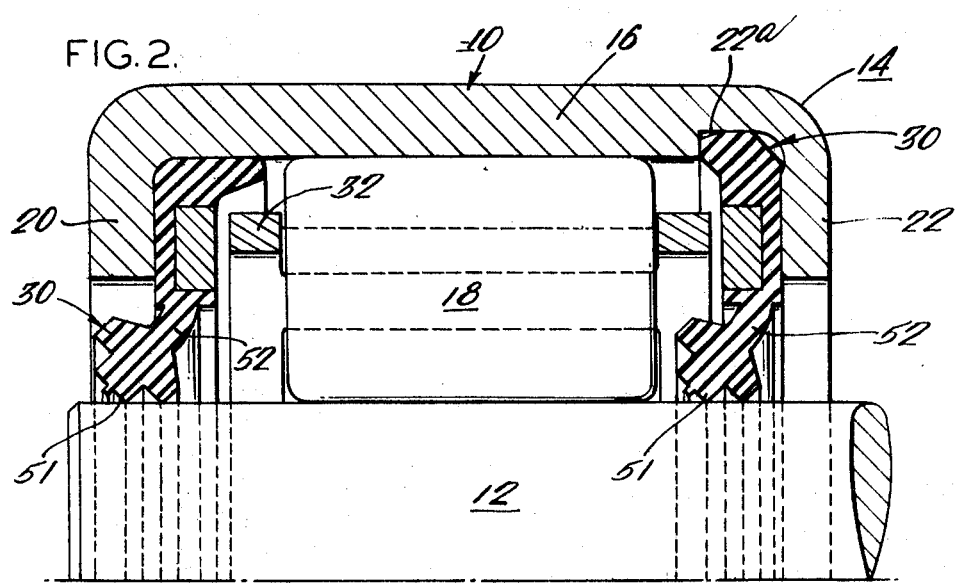
INVENTOR:
JOHN F. HELMS
BY Howson & Howson
ATTYS.

SEAL FOR NEEDLE ROLLER BEARINGS

The present invention relates to improvements in rolling bearings and more particularly to a seal assembly for use in needle roller bearings.

In the conventional roller bearing assembly including inner and outer rings in a plurality of rollers in the annular space between the rings, the problem of sealing the annular space between the rings is comparatively simplified. These seals usually consist of a resilient member which may have a reinforcing ring imbedded therein which snaps in place in a groove in the outer ring and has a feathered inner edge which engages a tapered surface on the inner ring. There is usually no problem in design or assembly of seals of this type because the tolerances of the other elements of the assembly such as the rings and the roller element may be maintained within narrow limits. Additionally it is noted that these assemblies are thick walled by comparison to needle rollers and do not present a particular problem in terms of machining to accommodate the seal.

Needle rollers, needle roller bearing assemblies, particularly the type that are adapted for assembly directly to a shaft, that is, those that do not include a separate inner ring present a particular problem in terms of providing an effective seal. In some needle roller bearing assemblies, the assembly simply consists of an outer cup-shaped shell forming the outer raceway for a plurality of rollers, a retainer for circumferentially spacing the rollers and usually some type of seal means at opposite axial ends of the rollers for retaining lubricant when the assembly is mounted directly on a shaft member or the like. In these assemblies, because of the comparatively small diameter of the rolling elements, it has been found that it is particularly difficult to design an effective seal which can be assembled easily and economically and which will be effectively retained in place in the bearing.

The present invention provides a seal assembly for bearings of this type which is extremely effective to provide a good seal regardless of which direction the bearing is mounted on a shaft.

These and other objects of the present invention and various features and details of the construction and arrangement of a needle roller bearing in accordance with the present invention are hereinafter more fully set forth with reference to the accompanying drawing wherein:

FIG. 1 is a side elevational view of a roller bearing assembly constructed in accordance with the present invention with parts broken away to show the internal construction thereof more clearly;

FIG. 2 is an enlarged sectional view taken on lines 2-2 of FIG. 1; and

FIG. 3 is an enlarged fragmentary sectional view through the seal for the roller bearing constructed in accordance with the present invention.

Referring now to the drawing and particularly to FIGS. 1 and 2 thereof, there is illustrated a rolling bearing assembly generally designated by the numeral 10 adapted to be mounted on a shaft member 12 or the like. In the present instance, the roller bearing assembly comprises a cup-shaped shell or housing 14 having a generally cylindrical center portion 16, the inner surface of which defines the outer raceway for the rollers 18 and a pair of radially inwardly directed flanges 20 and 22 at opposite axial ends of the cylindrical portion 16. The flange 20 is of approximately the same cross section as the center portion 16 whereas the flange 22 on the opposite end is of reduced cross section. The flange 20 is cold drawn in a die set and the flange 22 is folded after assembly of the seals and roller set in a final finishing operation. By reason of assembly in this manner, the housing of the shell 14 is of reduced cross section in the flange area to define a pocket 22a for mounting the seal at the axial end of the assembly. In the present instance, the assembly includes a retainer or cage 32 of conventional form having windowlike pockets for circumferentially spacing the rollers in a conventional manner.

Each of the seal assemblies 30 is identical in construction and accordingly the corresponding parts will be identified by the same numeral. Each seal comprises as illustrated in FIG. 3 an annular ringlike reinforcing member 36 which is imbedded in an outer resilient casing 40. The casing has an enlarged circumferentially extending bead portion 42 which as illustrated has a beveled outer shoulder 44 and a slightly tapered inner top circumferentially extending surface 46 for ease of insertion into the housing at assembly. The inside face of the bead is also chamfered as at 48 so that the rubber is more easily compressed when assembled. The bead 42 is slightly larger in diameter than the diameter of the reduced cross section 22a of the shell before folding the flange. In this manner, the seal which is mounted adjacent the flange 20 is seated by outer diameter compression. The seal mounted adjacent to flange 22 is seated by a combination of slightly less outer diameter compression plus axial squeeze resulting from the folding operation of the flange 22.

The casing further includes a web 50 confronting and covering the outer face of the reinforcing member 36 and connecting the bead 42 with the sealing lip 51. The sealing lip has a predetermined radial dimension so that it projects below the trace of the inner edge of the rollers whereby the seal is deflected when the bearing assembly is assembled as shown in FIG. 2. Further, the seal has a reduced neck portion 52 about which it is flexed and an X-shaped terminal edge configuration identified by the numeral 54. The crossarms 53 of the X-shaped lip have downwardly divergent upper surfaces as at 56 and the base of the lip has a flat bottom face as at 58. By this construction when the lip is deflected either inwardly as at the right-hand side of the assembly with respect to FIG. 2 or outwardly as on the left-hand side due to assembly of the bearing onto the shaft 12, a two-point axially spaced contact zone is insured with the periphery of the shaft at each seal location. Note also that the circumferentially extending mold flash at the base of the lip 51 created by the parting lines of the mold do not contact the shaft so that any irregularities do not adversely affect the sealing capacity or capability of the sealing lip.

The rolling bearing assembly of the present invention is extremely economical to make since it is comprised of comparatively few parts and is relatively easy to assemble. For example, the cup-shaped shell is originally formed with the flange 20 extending at right angles to the body portion 16 and the portion of reduced cross section for forming the flange 22 lying in the same plane as the body portion 16. As noted previously, the flange 20 may be cold drawn in a die set. With the shell in this form, a seal assembly 30 is inserted in the cup from the open end and pressed up against the flange 20 to the position shown in FIG. 2. Thereafter, a cage and roller set are inserted in the cup followed by pushing of another seal assembly 30 so that the nose 42a of the bead 42 confronts the shoulder at the juncture of the body portion and flange 22. The portion of reduced cross section is then folded inwardly to form the flange 22. The complete assembly is now ready to be mounted on a shaft on either end.

I claim:

1. A seal for a rolling bearing assembly adapted to be mounted on a shaft comprising a casing made of a resilient material, an annular ringlike reinforcing member mounted in said casing, said casing having an enlarged circumferential bead portion projecting radially outwardly from the outer edge of said reinforcing member, a lip section depending from said reinforcing member having a reduced neck portion and an X-shaped terminal edge configuration consisting of crossarms which are axially directed in the relaxed state and a base depending from the crossarms, said lip section adapted to deflect at the neck portion when assembled to a shaft whereby one of the crossarms and the base engage the shaft circumferentially at axially spaced locations.

2. A seal as claimed in claim 1 wherein the bead portion has a bevelled outer shoulder and a slightly tapered inner top circumferentially extending surface.

3. A seal as claimed in claim 1 wherein the crossarms of the X-shaped terminal edge configuration have downwardly divergent upper surfaces and the base of the lip is radially extending.

4. A bearing assembly adapted to be mounted on a shaft comprising a cup-shaped housing having a generally cylindrical center portion and a pair of radially inwardly directed flanges at opposite ends of said center portion, means defining a pocket adjacent at least one of said flanges, a plurality of rolling elements mounted interiorly of the housing, a retainer for circumferentially spacing the rolling elements and a seal adapted to be mounted in the housing at opposite axial ends thereof, said seal comprising a casing made of a resilient material, an annular ringlike reinforcing member mounted in said casing, said casing having an enlarged circumferential bead portion projecting radially outwardly from the outer edge of said reinforcing member, a lip section depending from said reinforcing member having a reduced neck portion and an X-shaped terminal edge configuration consisting of crossarms which are axially directed in the relaxed state and a base depending from the crossarms, said lip section adapted to deflect at the neck portion when assembled to a shaft whereby one of the crossarms and the base engage the shaft circumferentially at axially spaced locations.